United States Patent [19]

Kobale et al.

[11] 4,165,157

[45] Aug. 21, 1979

[54] LIQUID CRYSTAL CELL HAVING A GLASS FIBER FRAME

[75] Inventors: Manfred Kobale, Faistenhaar; Hans Krüeger, Munich, both of Fed. Rep. of Germany

[73] Assignee: Siemens Aktiengesellschaft, Berlin & Munich, Fed. Rep. of Germany

[21] Appl. No.: 822,205

[22] Filed: Aug. 5, 1977

[30] Foreign Application Priority Data

Aug. 10, 1976 [DE] Fed. Rep. of Germany ....... 2635942

[51] Int. Cl.² ............................................. G02F 1/13
[52] U.S. Cl. .................... 350/343; 350/344; 65/58; 29/592 R
[58] Field of Search ...................... 350/343, 344; 65/58

[56] References Cited

U.S. PATENT DOCUMENTS

| | | | |
|---|---|---|---|
| 3,661,444 | 5/1972 | Matthies | 350/343 X |
| 3,866,313 | 2/1975 | Yih | 350/343 X |
| 3,995,941 | 12/1976 | Nagahara et al. | 350/344 X |
| 4,050,786 | 9/1977 | Feldman | 350/344 |

FOREIGN PATENT DOCUMENTS 2445325  4/1975  Fed. Rep. of Germany .......... 350/343

Primary Examiner—Edward S. Bauer
Attorney, Agent, or Firm—Hill, Van Santen, Steadman, Chiara & Simpson

[57] ABSTRACT

A liquid crystal cell comprising at least two plate members each having a surface with at least a portion thereof having electric conductive coatings thereon and spacing means for maintaining the plate members with said surfaces parallel to one another to enclose a liquid crystal layer characterized by the spacing means consisting of at least one glass fiber which is imperviously connected to the plates by an adhesive. Preferably, the glass fiber is provided with an adhesive coating so that during assembly of the parts forming the cell, heat and pressures will cause the adhesive coating to be extruded from between the fiber and the surfaces of the plate member to enable the fiber to come into contact and to adhesively bond the fiber to the surfaces of the two plate members.

1 Claim, 1 Drawing Figure

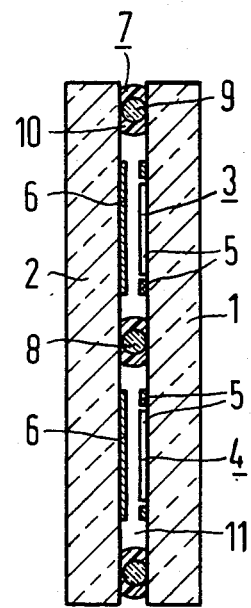

LIQUID CRYSTAL CELL HAVING A GLASS FIBER FRAME

BACKGROUND OF THE INVENTION

1. Field of the Invention

Present invention is directed to a liquid crystal cell having two carrier plates which are parallel to one another and enclose a liquid crystal layer. The two plates are spaced from one another at a specific distance by means of a spacing frame which consists of glass fibers which are imperviously connected to the plates. The invention is also directed to a method of producing the spacing frame for each of the liquid crystal cells.

2. Prior Art

A liquid crystal display device having a cell which has a spacing frame formed of glass fibers is disclosed in U.S. patent application Ser. No. 882,200 which is a continuation of abandoned U.S. patent application Ser. No. 655,506 (which corresponds to German application No. P25 05 513). As disclosed in this application, the carrier plates are fused to a glass fiber which forms a glass solder frame.

Frequently, the carrier plates of a liquid crystal cell must be spaced apart with a high degree of accuracy. This is particularly the case when the cell's characteristic data, which are dependent upon the thickness of the liquid crystal layer and consists for example of the switching characteristics and in particular the voltage values which govern the texture transition, are to be equal over the entire surface of the cell or displays area. Thus, for example, in matrix displays based on a so-called bistability effect as disclosed in German Offenlegungsschrift No. 23 61 421, the attainable multiplex ratio is decisively dependent upon how close the holding voltages can approximate the threshold voltage, for example, how sharply the critical voltage values are defined over the entire area of the matrix.

In British patent specification No. 1,387,677, which corresponds to Offenlegungsschrift No. 22 54 940, a liquid crystal cell utilizing inorganic spacing elements, which include glass fiber components for spacing the plates, is suggested. In exemplary embodiments disclosed in this patent, the fiber particles are provided solely as an additive to a glass solder frame formed in a conventional manner.

SUMMARY OF THE INVENTION

The present invention is directed to a liquid crystal cell for a liquid crystal display and a method of forming the display which display exhibits an extremely precise plate spacing but does not present any production difficulties in obtaining this precise plate spacing.

To accomplish this task, the invention is directed to an improvement in a liquid crystal cell comprising at least two carrier plate members, each preferably having a surface with at least a portion thereof having an electrical conductive coating thereon, and spacing means for maintaining the plate members with said surfaces parallel to one another to enclose the liquid crystal layer, said spacing means consisting of glass fibers imperviously connected to the plate with the improvement comprising the glass fibers being connected directly to adjacent surfaces of the carrier plate by an adhesive. Preferably, the adhesive is provided as a coating or casing on the glass fibers and is preferably a thermoplastic material, which is selected from a group consisting of epoxide, tetrafluorethylene, polyurethane, and acrylate, such as a plexiglass.

If the size of the liquid crystal cell is such that the spacing provided by the frame is inadequate, additional spacing elements may be inserted in the region of the liquid crystal layer between the carrier plates as suggested for large area displays, which are disclosed in abandoned U.S. Ser. No. 506,358 which corresponds with German Offenlegungsschrift No. 23 48 691. These additional spacing elements are formed of glass fibers, which are also preferably provided with an adhesive coating so that they are adhesively adjoined to the adjacent surfaces of the plates.

The method or process for producing the liquid crystal cell comprises the step of providing at least one glass fiber, each of said glass fibers having a synthetic adhesive casing, positioning the glass fibers in the desired pattern on a surface of one of said plate members, assembling the second carrier plate on the glass fibers and securing the plates together and to the glass fiber by applying a temperature and pressure so that the synthetic adhesive casing extrudes between the surfaces of the carrier plates and the fiber to enable each of the surfaces of the plate members to come into contact with the glass fiber and said synthetic material to adhesively connect said surfaces to said fiber. The step of providing the fibers having a synthetic adhesive casing preferably comprises drawing the glass fiber cores through a solution of said synthetic material to provide a fiber having the synthetic adhesive casing and preferably this step further includes preliminarily cross-linking said material of the synthetic material casing. Preferably, the step of positioning the fibers on one of said plates includes preheating said one carrier plate member to cause an attachment of the fiber to the surface thereof prior to assembling the second plate member thereon.

The present invention exploits the fact that it is possible to produce glass fibers, which exhibit virtually ideal straightness along the entire length and deviate by only a few percent from a given thickness which is in the order of a few 10 $\mu$m. If these glass fibers are not fused, but are secured with an adhesive under pressure of the carrier plates, they will maintain their extremely accurate dimensional forms and will space both plates at every point of the frame with an accuracy of a fraction of a $\mu$m.

The proposed liquid crystal cell of the present invention not only exhibits an accurate plate distance or spacing, but also can be produced by an extremely simple process. As mentioned here above, the glass fibers are first surrounded with an adhesive or synthetic adhesive casing or coating and glass fibers are then assembled on one of the carrier plates to form a frame and possibly to form spacing elements, if required. Then the second carrier plate is applied and the unit, which is attained in this way, is placed under temperatures and pressures to cause the adhesion of the fiber to the surfaces of the plates.

A particularly simple assembly is possible if the glass fiber casing is first preliminarily cross-linked in the manner of a so-called "prepreg". For example, if it is hardened to such an extent that the fiber casing loses its adhesive properties but still remains elastic. This produces a pliable wire, which can be easily handled and which merely requires being placed in the correct position on a sufficiently preheated substrate so that the casing will immediately adhere to the surface of the substrate and alleviate the need for further application and fixing means.

BRIEF DESCRIPTION OF THE DRAWING

The FIGURE is a cross sectional view of a liquid crystal cell in accordance with the present invention.

DESCRIPTION OF THE PREFERRED EMBODIMENT

The principles of the present invention are particularly useful in forming a liquid crystal cell as illustrated in the FIGURE. The cell consists of a front plate member 1 and a rear plate member 2, which is positioned with its surface parallel to the surface of the front plate. Both plates are provided with electrical conductive material forming electrodes on the surface facing each other with the front plate being provided with two front electrodes 3 and 4, which are composed of segments 5. The rear plate is provided with two continuous rear electrodes 6. The two plates are spaced from one another by a circular frame 7 and by a spacing element 8. The frame 7, and spacing element 8 each consist of a glass fiber 9, which abuts against the surfaces of the plates and is secured thereto by an adhesive 10. A chamber 11, which is defined by the plate 1 and 2 and frame 7 will contain a layer of liquid crystal material.

In the above described embodiment of the liquid crystal cell, the following materials have been selected for the cell components. The carrier plates 1 and 2 and the glass fibers 9 consist of cheap soft glass, the electrodes 3, 4 and 6 consist of a doped tin oxide, and the adhesive 10 is an epoxy resin. Any one of the conventional liquid crystal mixtures can be used for the liquid crystal material which is received in the chambers 11. Since the indices of refraction of the soft glass and epoxy resin both lie between 1.5 and 1.6, the spacing elements 7 and 8 of the above mentioned materials will hardly appear optically in the cell.

The outer diameter of the encased glass fibers 9 is expediently in a range of between 50 $\mu$m, and 200 $\mu$m and preferably between 100 and 150 $\mu$m. Epoxy wires having this sort of thickness and having a glass fiber core in particular a wire with a preliminary cross-linked casing can be readily wound, can be easily guided, can simply pass through a dispenser and also be installed or laid down in a pattern, which exhibits marked curvatures. In addition, the thick epoxy casing develops a considerable adhesive strength and in cooperation with the glass fiber core will reliably seal the cell chambers.

The frame 7 is produced in the following manner. First a glass fiber 9 is drawn through a synthetic solution of a epoxide base. The drawing speed and solution temperatures are selected with consideration for the viscosity of the synthetic material so that the synthetic membrane or coating 10 of a suitable thickness forms on the fiber. Typical values are: Drawing speed: 1 cm/s; Temperature: 25° C.; Viscosity 50 m Pa s; crosslinking: 150° C., 100 S. This fiber is then preliminarily cross-linked and is then positioned upon a preheated carrier plate to form a frame 7 and other similar fibers are positioned to form the spacing elements 8. Gaps, such as filling openings in the frame 7 and passage openings between portions of the cell, may be provided in the frame 7 and between the frame 7 and spacing elements 8. When a second likewise preheated plate is placed onto the frame 7 and spacing elements 8, the two plates are then compressed to such an extent that the thermoplastic synthetic material has been extruded from the regions between the surfaces of the plates 1 and 2 and the fiber 9 to allow the fiber 9 to form a direct contact with the surfaces of the plate members 1 and 2. In this position, the adhesive is hardened. The cell chamber is then filled with a liquid crystal substance and the frame openings are finally sealed in accordance with conventional procedures.

It would be possible to dispense with the filling openings in the frame and even passageway openings between the spacing elements if the liquid crystal substance was provided prior to completing the sealing of the cell. This can be accomplished by applying the liquid crystal layer in the space formed by the frame member 7 and the first plate 1 prior to adding the second plate member 2, which is subsequently heated and pressed into the sealing engagement with the frame.

The liquid crystal of the above mentioned type is particularly useful as a matrix display, which is operated on the basis of a bistability effect. It should be noted that large area displays can be easily produced by providing spacing elements 8 inside the spacing frame 7. These spacing elements are formed by the same type of fiber, which is encased with the desirable plastic, as the fibers, which is used to form the frame 7.

Although various minor modifications may be suggested by those versed in the art, it should be understood that we wish to include within the scope of the patent granted hereon, all such modifications as recently and properly come within the scope of our contribution to the art.

We claim:

1. A method of producing a liquid crystal cell comprising at least two plate members each having a surface with at least a portion thereof having electrical conductive coatings thereon, said plate members being spaced apart by a spacing frame means for maintaining the surfaces of the plates parallel to one another with the frame means and the two plates forming a chamber for receiving a liquid crystal material, said method comprising providing at least one glass fiber, drawing each glass fiber through a solution of synthetic adhesive material to produce a fiber having a synthetic adhesive casing, preliminarily cross-linking said material of the synthetic adhesive casing, positioning the glass fiber in the desired pattern of the spacing frame means on a surface of one of said plate members, preheating said one plate member to cause an attachment of the fiber to the surface thereof, assemblying the second plate member on the spacing frame means formed by the glass fiber, and then securing the plate members together and to the glass fiber of the frame means by applying temperature and pressure so that the synthetic adhesive casing extrudes between the surfaces of the plate member and the fibers to enable each of said surfaces of the plate members to come in contact with the fiber and said synthetic material to adhesively connect said surfaces to said fiber.

* * * * *